United States Patent

Okazaki et al.

[11] Patent Number: 5,915,416
[45] Date of Patent: Jun. 29, 1999

[54] THREE WAY ELECTROMAGNETIC VALVE

[75] Inventors: Masafumi Okazaki; Hiromasa Ozawa, both of Tokyo, Japan

[73] Assignee: Mitsubishi Denki Kabushiki Kaisha, Tokyo, Japan

[21] Appl. No.: 08/941,206

[22] Filed: Sep. 30, 1997

[30] Foreign Application Priority Data

Jun. 18, 1997 [JP] Japan .................................. 9-161461

[51] Int. Cl.⁶ ................................................ F15B 13/044
[52] U.S. Cl. ............................. 137/596.17; 251/129.14
[58] Field of Search .................. 137/596.17; 251/129.14

[56] References Cited

U.S. PATENT DOCUMENTS

| 3,451,429 | 6/1969 | Vick | 251/129.14 X |
|---|---|---|---|
| 4,301,715 | 11/1981 | Acar | 137/596.17 X |
| 4,338,966 | 7/1982 | Smith | 137/596.17 |
| 4,509,716 | 4/1985 | Barber et al. | 251/129.14 |
| 4,610,267 | 9/1986 | Beck et al. | 137/596.17 |
| 4,997,004 | 3/1991 | Barkhimer | 137/596.17 |
| 4,998,559 | 3/1991 | McAuliffe | 137/596.17 |
| 5,606,992 | 3/1997 | Erickson et al. | 137/596.17 |
| 5,636,828 | 6/1997 | Brehm et al. | 251/129.14 |
| 5,711,344 | 1/1998 | Mullally | 137/596.17 |

FOREIGN PATENT DOCUMENTS

| 8-105563 | 4/1996 | Japan . |
|---|---|---|
| 162810 | 7/1991 | Taiwan . |
| 231331 | 10/1994 | Taiwan . |

*Primary Examiner*—Gerald A. Michalsky
*Attorney, Agent, or Firm*—Sughrue, Mion, Zinn, Macpeak & Seas, PLLC

[57] ABSTRACT

A three way electromagnetic valve has a plunger provided with a small-diameter section, the diameter of which is smaller than the diameter of a plunger seat, so as to increase the sectional area of a fluid passage running between an output port and a discharge port. The inner wall surface of a ball holding section is provided with ball guides for guiding a ball. The diameter of the ball holding section is made larger than the diameter of the ball in order to secure the flow rate of a fluid in the ball holding section.

10 Claims, 12 Drawing Sheets

THREE WAY ELECTROMAGNETIC VALVE

BACKGROUND OF THE INVENTION

1. Field of the Invention

The present invention relates to a three way electromagnetic valve whereby a passage can be switched by the displacement of a ball driven by an electromagnetic device.

2. Description of Related Art

FIG. 14 is a sectional view of a conventional normally closed three way electromagnetic valve disclosed in, for example, Japanese Laid-Open Patent Application No. 8-105563. In the drawing, a bobbin 1, which is a resin molded article, is provided with an input port 2, an output port 3, a discharge port 4, and a fluid passage 1A which communicates the ports 2 through 4 and which extends in the axial direction. The bobbin 1 also has a plate 5 and terminals 6, 7 which constitute a magnetic passage and which are formed by insert molding. Provided on the outer periphery of the bobbin 1 are a coil winding portion 1a and O ring grooves 1b, 1c.

A coil 8 is fixed onto the coil winding portion 1a, and O rings 9, 10 for preventing the leakage of fluid are respectively fitted in the O ring grooves 1b, 1c. The winding start tip of the coil 8 is wound onto the terminal 6 and soldered thereto, while the winding end tip thereof is wound onto the terminal 7 and soldered thereto.

The fluid passage 1 A is provided with a tapered discharge valve seat 1d and an input valve seat 1e; a sealing ball 11 which moves into contact with or away from the input valve seat 1e is inserted in the fluid passage 1 A at the input port 2 end. A retainer 12 for preventing the ball 11 from coming off is inserted in the input port 2 and fixed by a thermally caulked section 1f.

In the bobbin 1, a plunger 13 made of a magnetic material is slidably inserted in the axial direction. FIG. 15 is a sectional view of the plunger 13 of FIG. 14; the plunger 13 is equipped with a push rod 13a for pushing the ball 11, and a plunger seat 13b which moves into contact with or away from the discharge valve seat 1d.

The portion of the bobbin 1 where the coil 8 is attached is enclosed by a cylindrical case 14 to which a flange 15 has been welded to ground the case 14. An end of the terminal 7 is welded to the case 14. A bush 16 made of a magnetic material is inserted in the rear end of the bobbin 1 in such a manner that it does not come in contact with the plunger 13. The bush 16 is magnetically connected to the case 14 via a holder 17 made of a magnetic material. The bush 16 and the holder 17 are fixed with respect to the bobbin 1 by a plate 18 made of a nonmagnetic material. The terminal 6 is protected by a cover 19 against external forces.

The operation of the three way electromagnetic valve will now be described. When the coil 8 is not in an excited state, that is, when it is in a de-energized state, the pressure of a fluid applied to the input port 2 pushes the ball 11 against the input valve seat 1e to cut off the flow of the fluid coming through the input port 2. At this time, the plunger 13 is pushed up by the ball 1, and the plunger seat 13b is released from the discharge valve seat 1d, causing the output port 3 and the discharge port 4 to be communicated.

The moment the coil 8 is excited, magnetism runs through a magnetic circuit constituted by the case 14, the plate 5, the plunger 13, the bush 16, and the holder 17, causing the plunger 13 to be attracted to the plate 5. The attracting force causes the plunger 13 to move toward the plate 5 against the pressure of the fluid acting on the ball 11. This pushes the plunger seat 13b against the discharge valve seat 1d so as to cut off the flow of the fluid to the discharge port 4, and the push rod 13a pushes the ball 11 so as to release it from the input valve seat 1e, thus communicating the input port 2 with the output port 3.

FIG. 16 is a sectional view illustrative of an example of a conventional normally open three way electromagnetic valve. In the drawing, a bobbin 21 which is a resin molded article is provided with an input port 22, an output port 23, a discharge port 24, and a fluid passage 21A which communicates the ports 22 through 24 and which extends in the axial direction. The bobbin 21 also has a yoke 25 and terminals 26, 27 which constitute a magnetic passage and which have been formed by insert molding. The yoke 25 has been machined to have a flanged cylindrical shape by drawing a discoid iron plate. Provided on the outer periphery of the bobbin 21 are a coil winding portion 21a and O ring grooves 21b, 21c.

A coil 28 is fixed onto the coil winding portion 21a, and O rings 29, 30 for preventing the leakage of fluid are respectively fitted in the O ring grooves 21b, 21c. The winding start tip of the coil 28 is wound onto the terminal 26 and soldered thereto, while the winding end tip of the coil 28 is wound onto the terminal 27 and soldered thereto.

The fluid passage 21 A is provided with a tapered discharge valve seat 21d and an input valve seat 21e; a sealing ball 31 which moves into contact with or away from the input valve seat 21e is inserted in the fluid passage 21A at the input port 22 end. A retainer 32 for preventing the ball 31 from coming off is inserted in the input port 22 and fixed by a thermally caulked section 21f.

In the bobbin 21, a plunger 33 made of a magnetic material is slidably inserted in the axial direction. FIG. 17 is a sectional view of the plunger 33 of FIG. 16. The plunger 33 is equipped with a push rod 33a for pushing the ball 31, a plunger seat 33b which moves into contact with or away from the discharge valve seat 21d, and a rib 33c for shifting the flow of a fluid to the downward direction in the drawing.

The portion of the bobbin 21 where the coil 28 is attached is enclosed by a cylindrical case 34 to which a flange 35 has been welded to ground the case 34. The terminal 27 is welded to the case 34. A core 36 which has a through hole 36a and which is made of a magnetic material is press-fitted in the rear end of the bobbin 21. A spring 37 urging the plunger 33 toward the ball 31 is provided between the core 36 and the plunger 33 in the bobbin 21. A plate 38 is caulked to the rear end of the case 34. The terminal 26 is protected by a cover 39 against external forces.

The operation of this three way electromagnetic valve will now be described. When the coil 28 is not in an excited state, that is, when it is in a de-energized state, the urging force of the spring 37 moves the plunger 33 to the ball 31, causing the plunger seat 33b to be pushed against the discharge valve seat 21d, and the ball 31 is pushed by the push rod 33a so as to be released from the input valve seat 21e, thus causing the input port 22 and the output port 23 to be communicated.

The moment the coil 28 is excited, magnetism runs through a magnetic circuit constituted by the yoke 25, the plunger 33, the core 36, the plate 38, and the case 34, thus causing the plunger 33 to be attracted to the core 36 against the spring 37. This releases the plunger seat 33b from the discharge valve seat 21d and also pushes the ball 31 against the input valve seat 21e, thus causing the output port 23 and the discharge port 24 to be communicated.

In the normally closed or normally open three way electromagnetic valve configured as described above, since the push rods 13a, 33a and the balls 11, 31 are disposed in the fluid passages 1A, 21A, the sectional areas of the fluid passages 1A, 21A are inevitably small. Therefore, when oil, for example, is employed as a fluid, smooth flow of the oil is prevented when the viscosity of the oil increases at low temperature because of the small sectional areas of the fluid passages 1A, 21A.

To cope with the problem of small sectional areas, a conventional electromagnetic valve as shown, for example, in FIG. 18 and FIG. 19 increases the sectional areas of the fluid passages 1A, 21A by increasing the inside diameters of the bobbins 1, 21 in relation to the outside diameters of the balls 11, 31. This design undesirably causes the push rods 13a, 33a to shake in the radial direction when the push rods 13a, 33a push the balls 11, 31, leading to unstable operation.

FIG. 20 is a schematic representation illustrating the relationship between the plunger 13 and the ball 11 when the normally closed three way electromagnetic valve is in a de-energized state, and FIG. 21 is a front view illustrative of the position of the ball 11 of FIG. 20. FIG. 22 is a schematic representation showing an example of a state of the assembly shown in FIG. 20 wherein energization has been started; FIG. 23 is a schematic representation showing another example of the state of the assembly shown in FIG. 20 wherein energization has been started; FIG. 24 is a front view illustrating the position of the ball 11 of FIG. 22 and FIG. 23; and FIG. 25 is a schematic representation illustrating a state wherein the operation cycle of the plunger 13 of FIG. 20 has been completed. Thus, there are two ways to reach the state illustrated in FIG. 25; in one way, the state shown in FIG. 20 is changed to the state shown in FIG. 25 through the state shown in FIG. 22, while in the other way, the state shown in FIG. 20 is shifted to the one shown in FIG. 25 through the state shown in FIG. 23.

In the state illustrated in FIG. 23, the distal end of the push rod 13a has run aground on the ball 11; therefore, the plunger 13 significantly tilts and moves while being pushed against the inner wall surface of the bobbin 1. Hence, it is more difficult for the plunger 13 to move in the state shown in FIG. 23 than in the state shown in FIG. 22, thus requiring larger operating current. Thus, since the operation of the plunger 13 is unstable, the operating current and the operating voltage fluctuate accordingly.

SUMMARY OF THE INVENTION

The present invention has been made with a view toward solving the problems described above, and it is an object of the invention to provide a three way electromagnetic valve which permits the flow rate of a fluid to be secured and which also permits stable operation of a plunger and stable operating current and operating voltage.

To this end, according to one aspect of the present invention, there is provided a three way electromagnetic valve equipped with: a bobbin which has first through third ports, a fluid passage communicating these ports, a first valve seat provided between the first and second ports in the fluid passage, a second valve seat provided between the second and third ports in the fluid passage, and a ball holding section provided at an end of the fluid passage where the first port is located; a ball which is held in the ball holding section in such a manner that it may reciprocate and which moves into contact with or away from the first valve seat; a coil mounted on the bobbin; and a plunger which is inserted in the fluid passage, which has a push rod held against the ball and a plunger seat that moves into contact with or away from the second valve seat, and which reciprocates according to whether the coil is energized or de-energized; wherein a small-diameter section which has a diameter smaller than that of the plunger seat is provided at a portion ports of the plunger in the fluid passage between the second and third.

According to another aspect of the present invention, there is provided a three way electromagnetic valve equipped with: a bobbin which has first through third ports, a fluid passage communicating these ports, a first valve seat provided between the first and second ports in the fluid passage, a second valve seat provided between the second and third ports in the fluid passage, and a ball holding section provided at an end of the fluid passage where the first port is located; a ball which is held in the ball holding section in such a manner that it may reciprocate and which moves into contact with or away from the first valve seat; a coil mounted on the bobbin; and a plunger which is inserted in the fluid passage, which has a push rod held against the ball, and a plunger seat that moves into contact with or away from the second valve seat, and which reciprocates according to whether the coil is energized or de-energized; wherein a plurality of plunger guides which extend in parallel to the operating direction of the plunger and which project in the radial direction are provided at intervals in the circumferential direction either on the wall surface of the fluid passage between the second port and the third port or on the outer peripheral surface of the plunger.

According to yet another aspect of the present invention, there is provided a three way electromagnetic valve equipped with: a bobbin which has first through third ports, a fluid passage communicating these ports, a first valve seat provided between the first and second ports in the fluid passage, a second valve seat provided between the second and third ports in the fluid passage, and a ball holding section provided at an end of the fluid passage where the first port is located; a ball which is held in the ball holding section in such a manner that it may reciprocate and which moves into contact with or away from the first valve seat; a coil mounted on the bobbin; and a plunger which is inserted in the fluid passage, which has a push rod held against the ball, and a plunger seat that moves into contact with or away from the second valve seat, and which reciprocates according to whether the coil is energized or de-energized; wherein the inner wall surface of the ball holding section is provided with a plurality of ball guides which extend in parallel to the operating direction of the plunger, which project inward, and which are provided at intervals in the circumferential direction.

DESCRIPTION OF THE PREFERRED EMBODIMENTS

The embodiments of the present invention will now be described.

First Embodiment

Figure 1:
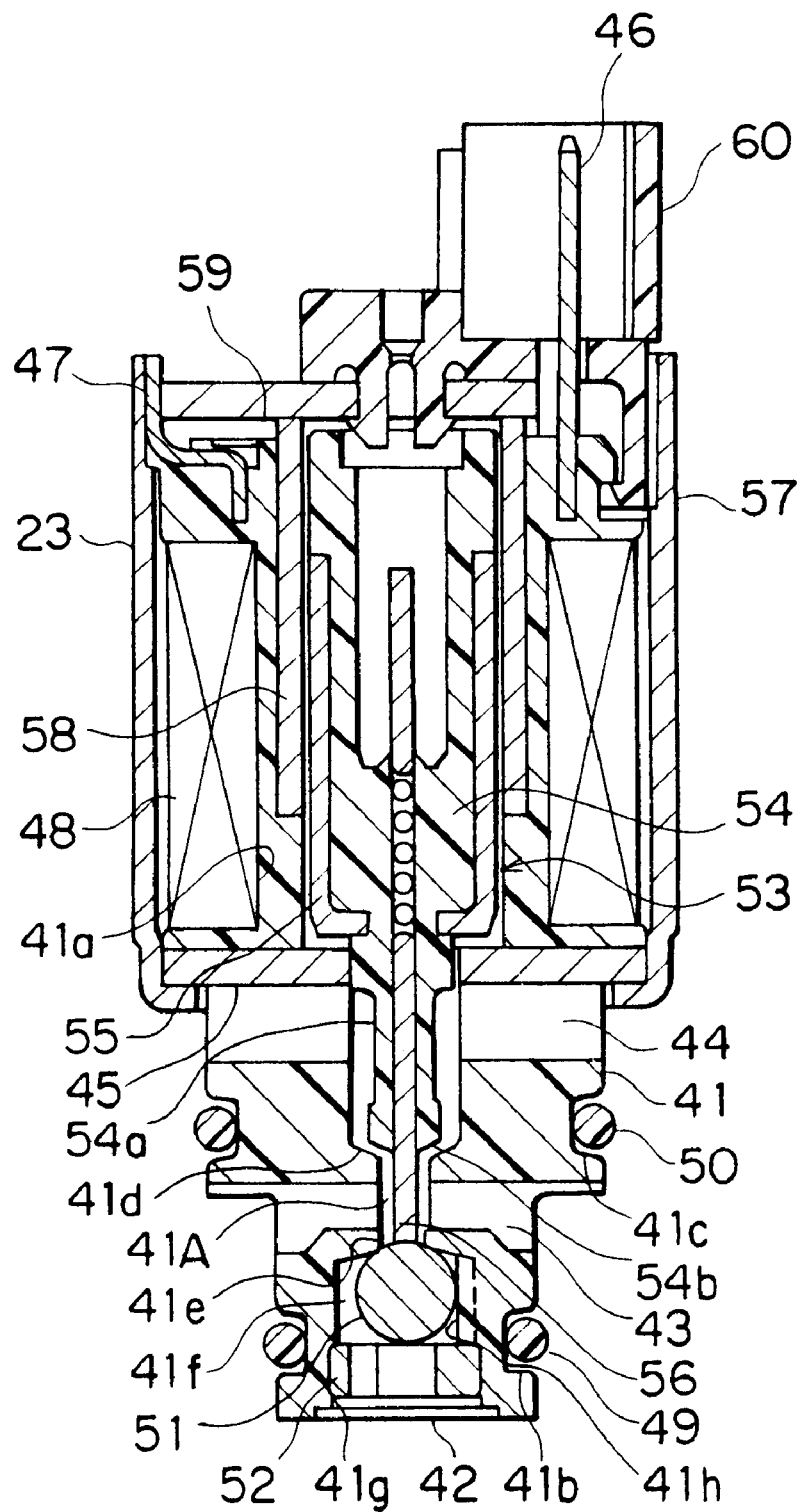
FIG. 1 is a sectional view of a normally closed three way electromagnetic valve according to a first embodiment of the present invention.

FIG. 1 is a sectional view of a normally closed three way electromagnetic valve according to a first embodiment of the present invention. In the drawing, a bobbin 41, which is a resin molded article, is provided with an input port 42 serving as a first port, an output port 43 serving as a second port, a discharge port 44 serving as a third port, and a fluid passage 41A which communicates the ports 42 through 44 and which extends in the axial direction. The bobbin 41 also has a plate 45 and terminals 46, 47 which constitute a magnetic passage and which are formed by insert molding.

Provided on the outer periphery of the bobbin 41 are a coil winding portion 41a and O ring grooves 41b, 41c. A coil 48 is fixed onto the coil winding portion 41a, and O rings 49, 50 for preventing the leakage of fluid are respectively fitted in the O ring grooves 41b, 41c. The winding start tip of the coil 48 is wound onto the terminal 46 and soldered thereto, while the winding end tip of the coil 48 is wound onto the terminal 47 and soldered thereto.

The fluid passage 41A is provided with a discharge valve seat 41d serving as a second valve seat and an input valve seat 41e serving as a first valve seat. A ball holding section 41f is provided at the input port 42 end of the fluid passage 41A; a sealing ball 51 which moves into contact with or away from the input valve seat 41e is inserted in the ball holding section 41f. Further, a retainer 52 for preventing the ball 51 from coming off is inserted in the input port 42 and fixed by a thermally caulked section 41g.

In the bobbin 41, a plunger 53 is slidably inserted along the axial direction. The distal end of the plunger 53 is inserted in the fluid passage 41A. The plunger 53 has a plunger main body 54 made of resin, a cylindrical member 55 which is fixed to the outer periphery of the plunger main body 54 to constitute a magnetic passage and which is a magnetic body, and a metallic push rod 56 which has been formed by insert molding along the axis of the plunger main body 54.

The plunger main body 54 has a small-diameter section 54a for increasing the sectional area of the fluid passage 41A between the output port 43 and the discharge port 44, and a plunger seat 54b which moves into contact with or away from the discharge valve seat 41d. The push rod 56 is knurled to prevent it from coming off; the push rod 56 may alternatively be provided with, for example, a step as a means for preventing it from coming off.

The portion of the bobbin 41 where the coil 48 is attached is enclosed by a cylindrical case 57. An end of the terminal 47 is welded to the case 57. A sleeve 58 made of a magnetic material is inserted in the rear end of the bobbin 41 in such a manner that it does not come in contact with the plunger 53, the sleeve 58 being magnetically connected to the case 57 via a plate 59 made of a magnetic material. The terminal 46 is protected by a cover 60 mounted on the bobbin 41 and the plate 59.

Figure 2:
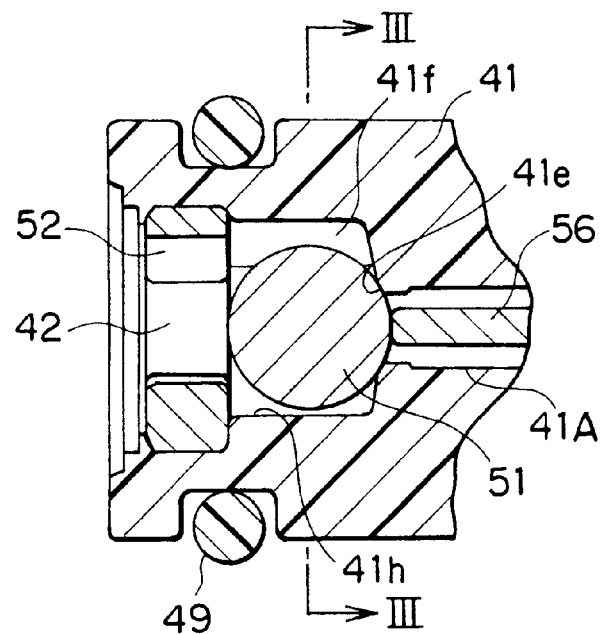
FIG. 2 is an enlarged sectional view illustrative of the distal end of a bobbin shown in FIG. 1.
Figure 3:
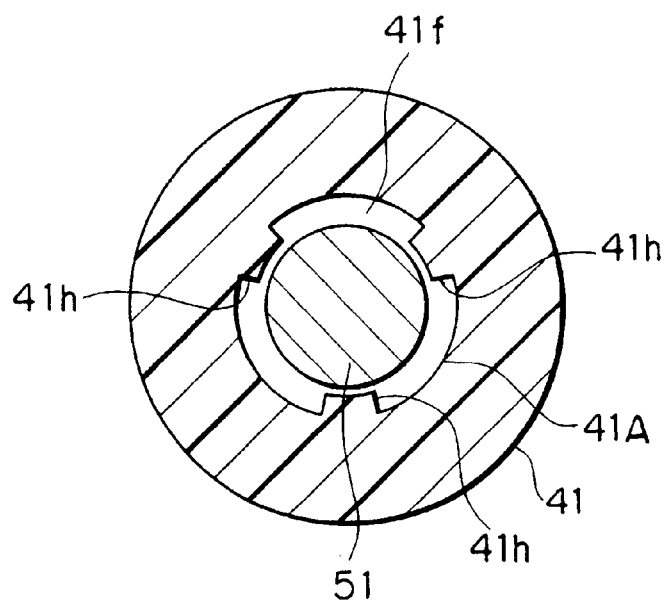
FIG. 3 is a sectional view at the line III—III of FIG. 2.

FIG. 2 is an enlarged sectional view of the distal end of the bobbin 41 shown in FIG. 1, and FIG. 3 is a sectional view at the line III—III of FIG. 2. A plurality of ball guides 41h which extend in parallel to the operating direction of the plunger 53, i.e. the lateral direction in FIG. 2, and which jut out inward are provided equidistantly in the circumferential direction on the inner wall surface of the ball holding section 41f. There is an appropriate clearance between the ball 51 and ball guides 41h to allow the ball 51 to move between the ball guides 41h.

The operation of the embodiment will now be described. When the coil 48 is not in an excited state, that is, when it is a de-energized state, the pressure of a fluid applied to the input port 42 pushes the ball 51 against the input valve seat 41e to cut off the flow of the fluid coming through the input port 42. At this time, the plunger 53 is pushed up by the ball 51, and the plunger seat 54b is released from the discharge valve seat 51d, causing the output port 43 and the discharge port 44 to be communicated.

The moment the coil 48 is excited, magnetism runs through a magnetic circuit constituted by the case 57, the plate 45, the cylindrical member 55 of the plunger 53, the sleeve 58, and the plate 59, causing the plunger 53 to be attracted to the plate 45. The attracting force causes the plunger 53 to move toward the plate 45 against the pressure of the fluid acting on the ball 51. This pushes the plunger seat 54b against the discharge valve seat 41d so as to cut off the flow of the fluid to the discharge port 44, and the push rod 56 pushes the ball 51 so as to release it from the input valve seat 41e, thus communicating the input port 42 with the output port 43.

Thus, the ball 51 reciprocates in the axial direction of the plunger 54 in the ball holding section 41f according to the movement of the plunger 54. In this case, the diameter of the ball holding section 41f which is a part of the fluid passage 41A is made sufficiently larger than the diameter of the ball 51 to ensure the flow rate. The ball 51 is guided by a plurality of ball guides 41h and it reciprocates along the same trajectory.

Figure 4:
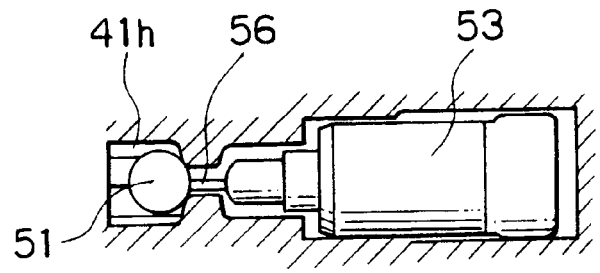
FIG. 4 is a schematic representation illustrative of the relationship between a plunger and a ball in a de-energized state of the first embodiment shown in FIG. 1.
Figure 5:
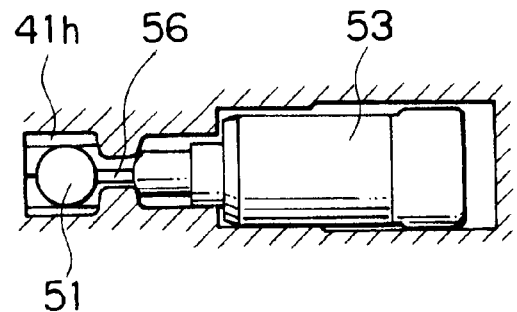
FIG. 5 is a schematic representation illustrative of a state wherein the supply of current has begun in FIG. 4.
Figure 6:
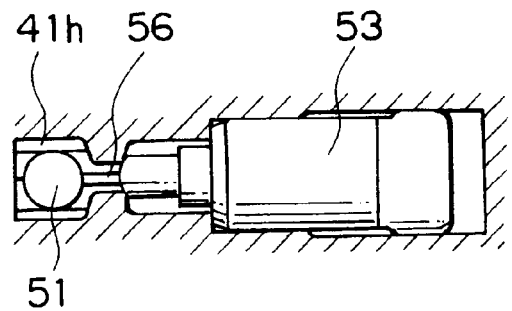
FIG. 6 is a schematic representation illustrative of a state wherein the operation of the plunger shown in FIG. 4 has been completed.
Figure 21:
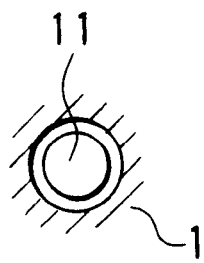
FIG. 21 is a front view illustrative of the position of the ball shown in FIG. 20.
Figure 22:
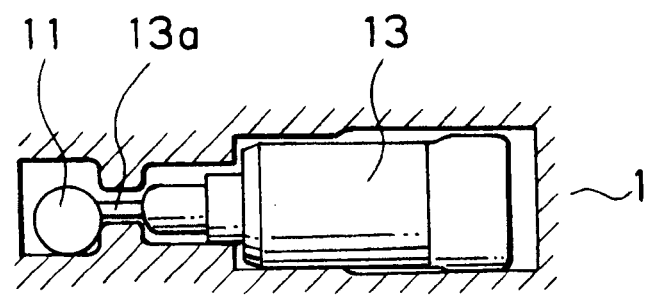
FIG. 22 is a schematic representation illustrative of an example of a state wherein the supply of current has begun in FIG. 20.
Figure 23:
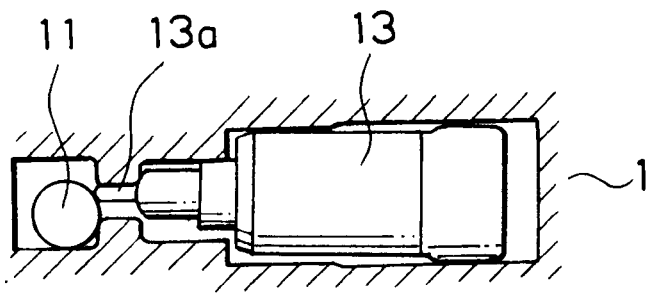
FIG. 23 is a schematic representation illustrative of another example of a state wherein the supply of current has begun in FIG. 20.
Figure 24:
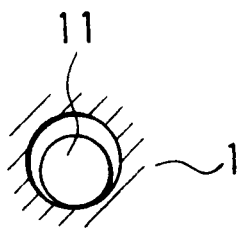
FIG. 24 is a front view illustrative of the position of the ball shown in FIG. 22 and FIG. 23.
Figure 25:
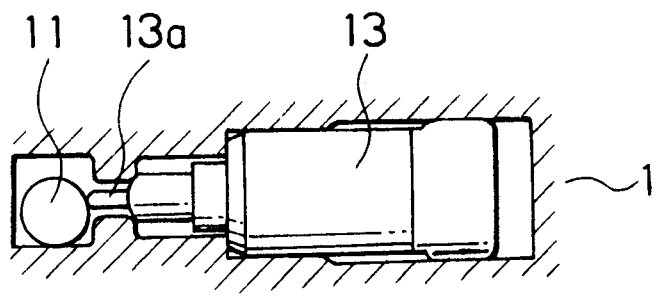
FIG. 25 is a schematic representation illustrative of a state wherein the operation of the plunger shown in FIG. 20 has been completed.

FIG. 4 is a schematic representation illustrative of the relationship between the plunger 53 and the ball 51 in a de-energized state of the first embodiment shown in FIG. 1; FIG. 5 is a schematic representation illustrative of a state wherein the supply of current has begun in FIG. 4; and FIG. 6 is a schematic representation illustrative of a state wherein the operation of the plunger 53 shown in FIG. 4 has been completed. The position of the ball 51 shown in FIG. 4 through FIG. 6 is the same as that shown in FIG. 21. Since the ball 51 moves while being guided by the ball guides 41h as described above, the operation of the plunger 53 is stabilized and the operating voltage and operating current are also stabilized.

Furthermore, since the plunger main body 54 is provided with a small-diameter section 54a to increase the sectional area of the fluid passage 41A between the output port 43 and the discharge port 44, the flow rate at low temperature will be secured so as to ensure responsiveness of a hydraulic circuit even when a fluid such as oil, the viscosity of which increases at low temperature, is employed.

Figure 7:
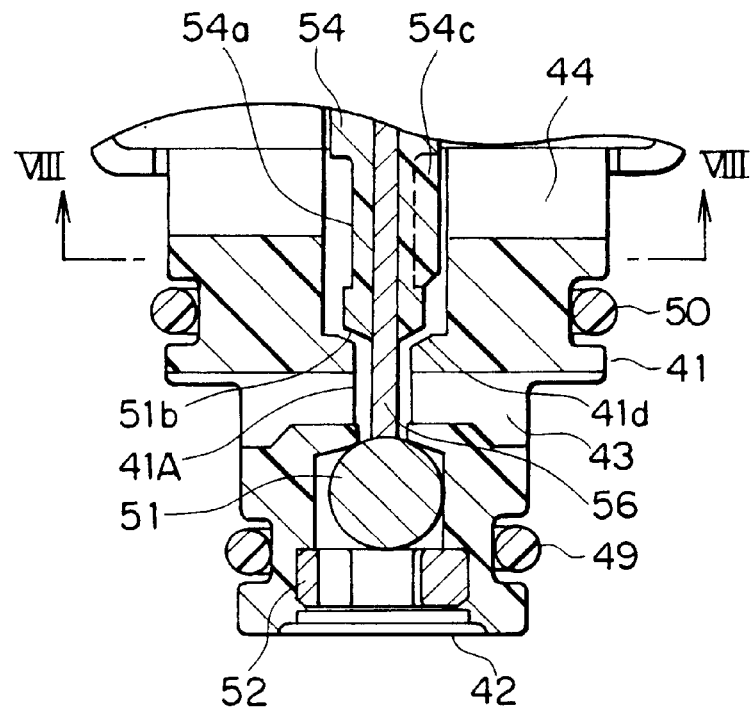
FIG. 7 is a sectional view of an essential section showing a modification example of the three way electromagnetic valve shown in FIG. 1.
Figure 8:
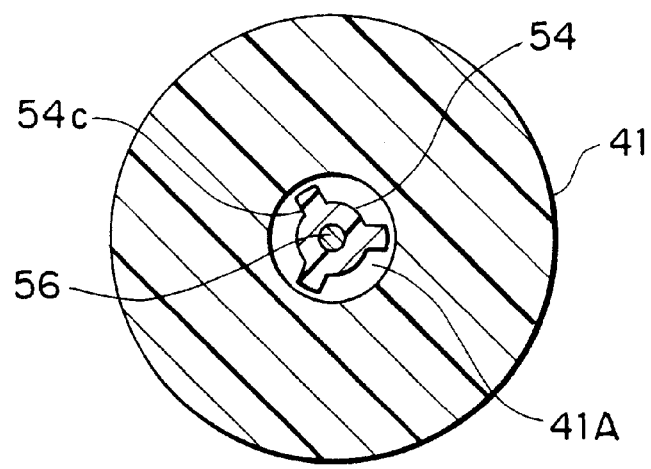
FIG. 8 is a sectional view at the line VIII—VIII of FIG. 7.

In the above example, the sectional area of the fluid passage 41A is increased by providing the plunger main body 54 with the small-diameter section 54a; however, the structure of the fluid passage 41A between the output port 43 and the discharge port 44 may be identical to that of the ball holding section 41f. More specifically, as shown in FIG. 7 and FIG. 8, a plurality of plunger guides 54c jutting outward may be provided on the outer peripheral surface of the plunger main body 54 between the output port 43 and the discharge port 44.

Figure 9:
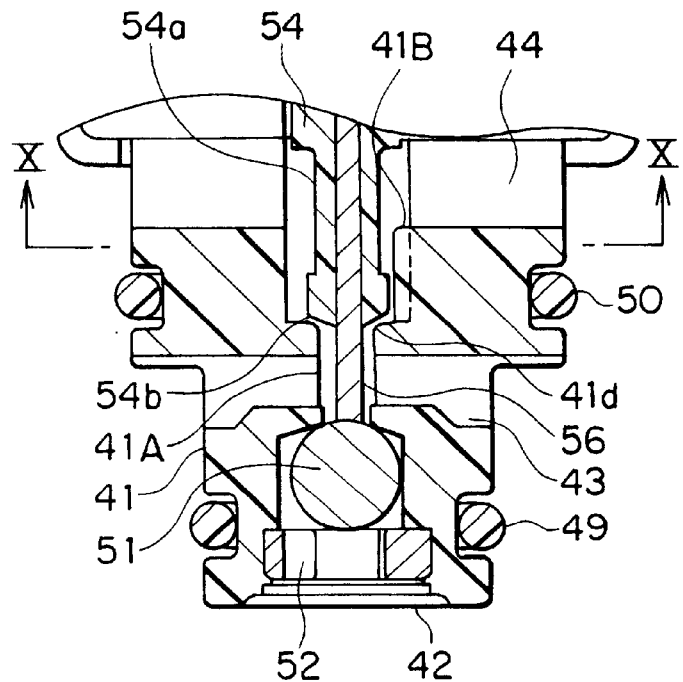
FIG. 9 is a sectional view of an essential section showing another modification example of the three way electromagnetic valve shown in FIG. 1.
Figure 10:
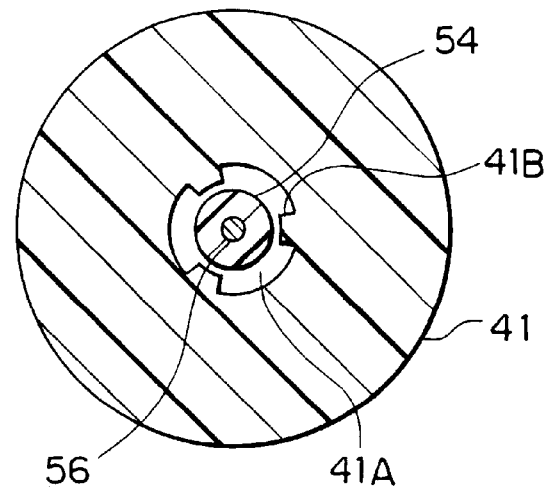
FIG. 10 is a sectional view at the line X—X of FIG. 9.

As an alternative, a plurality of plunger guides 41B which extend in parallel to the operating direction of the plunger 53 and which project inward may be provided at intervals in the circumferential direction on the wall surface of the fluid passage 41A between the output port 43 and the discharge port 44 as shown in FIG. 9 and FIG. 10.

Second Embodiment

Figure 11:
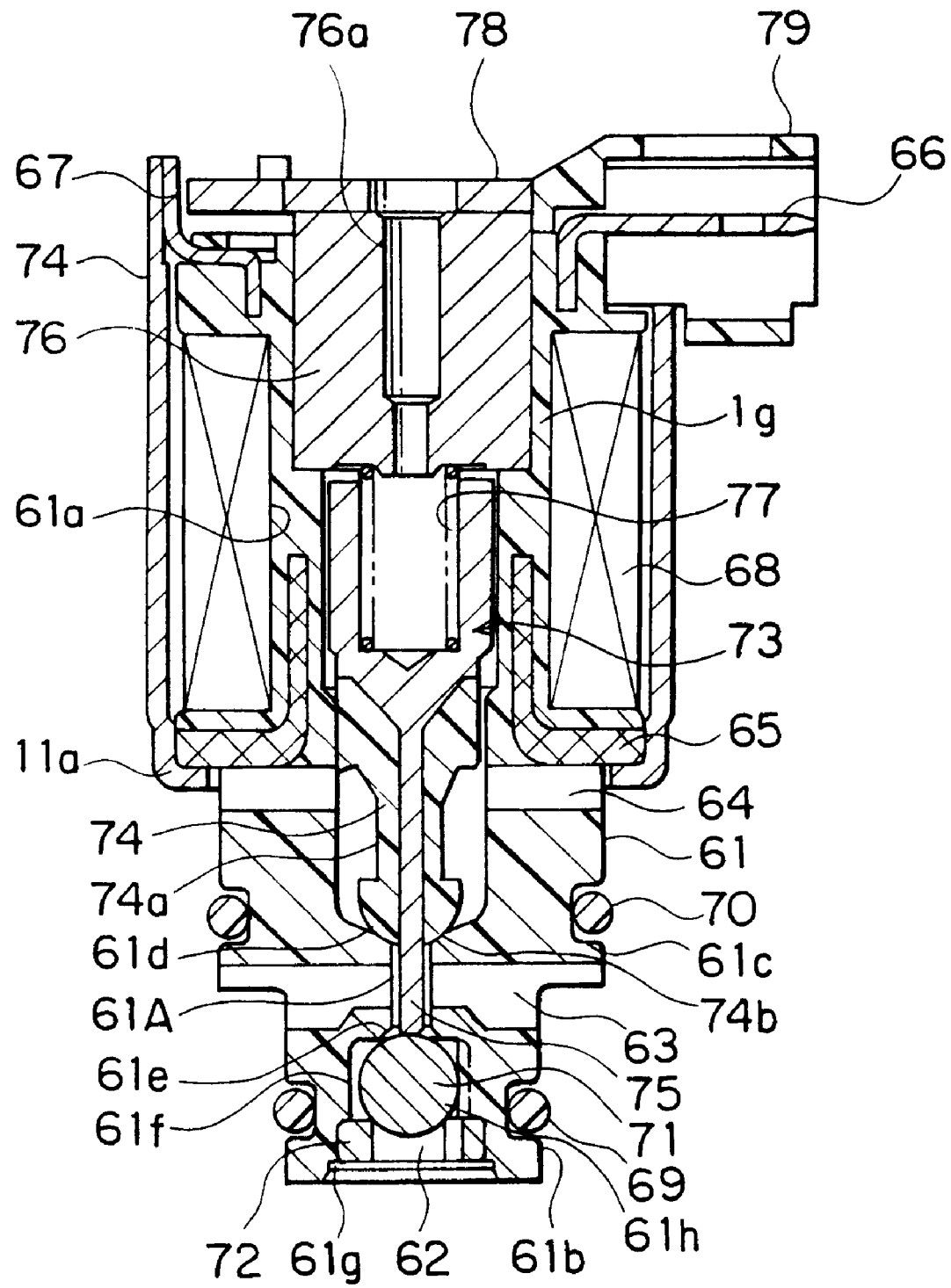
FIG. 11 is a sectional view of a normally open three way electromagnetic valve according to a second embodiment of the present invention.

FIG. 11 is a sectional view of a normally open three way electromagnetic valve according to a second embodiment of the present invention. In the drawing, a bobbin 61 which is a resin molded article is provided with an input port 62 serving as a first port, an output port 63 serving as a second port, a discharge port 64 serving as a third port, and a fluid passage 61A which communicates the ports 62 through 64 and which extends in the axial direction. The bobbin 61 also has a yoke 65 and terminals 66, 67 which constitute a magnetic passage and which is formed by insert molding. The yoke 65 is machined to have a flanged cylindrical shape by drawing a discoid iron plate. Provided on the outer periphery of the bobbin 61 are a coil winding portion 61a and O ring grooves 61b, 61c.

A coil 68 is fixed onto the coil winding portion 61a, and O rings 69, 70 for preventing the leakage of fluid are respectively fitted in the O ring grooves 61b, 61c. The winding start tip of the coil 68 is wound onto the terminal 66 and soldered thereto, while the winding end tip of the coil 68 is wound onto the terminal 67 and soldered thereto.

The fluid passage 61A is provided with a discharge valve seat 61d serving as a second valve seat and an input valve seat 61e serving as a first valve seat. A ball holding section 61f is provided at the input port 62 end of the fluid passage 61A. Inserted in the ball holding section 61f is a sealing ball 71 which moves into contact with or away from the input valve seat 61e. A retainer 72 for preventing the ball 71 from coming off has inserted in the input port 62 and fixed by a thermally caulked section 61g.

In the bobbin 61, a plunger 73 is slidably inserted in the axial direction. The plunger 73 has a resinous plunger main body 74 and a push rod 75 which is inserted-molded in the plunger main body 74 and which is made of a magnetic material. The plunger main body 74 has a small-diameter section 74a for increasing the sectional area of the fluid passage 61A between the output port 63 and the discharge port 64, and a plunger seat 74b which moves into contact with or away from the discharge valve seat 61d. As the push rod, the same pin as that in the first embodiment described above may be used.

The portion of the bobbin 61 where the coil 68 is attached is enclosed by a cylindrical case 74. The terminal 67 is welded to the case 74. A core 76 which has a through hole 76a and which is made of a magnetic material is press-fitted in the rear end of the bobbin 61. A spring 77 urging the plunger 73 toward the ball 71 is provided between the core 76 and the plunger 73 in the bobbin 61. A plate 78 is caulked to the rear end of the case 74. The terminal 66 is protected by a cover 79 against external forces.

Figure 12:
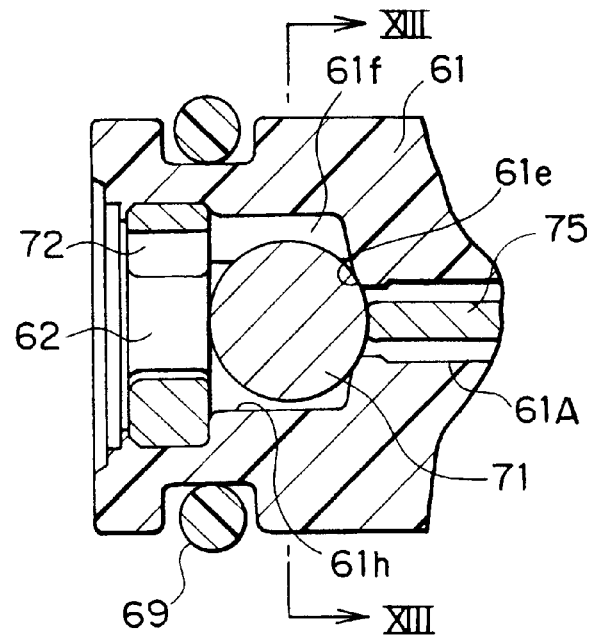
FIG. 12 is an enlarged sectional view illustrative of the distal end of a bobbin shown in FIG. 11.
Figure 13:
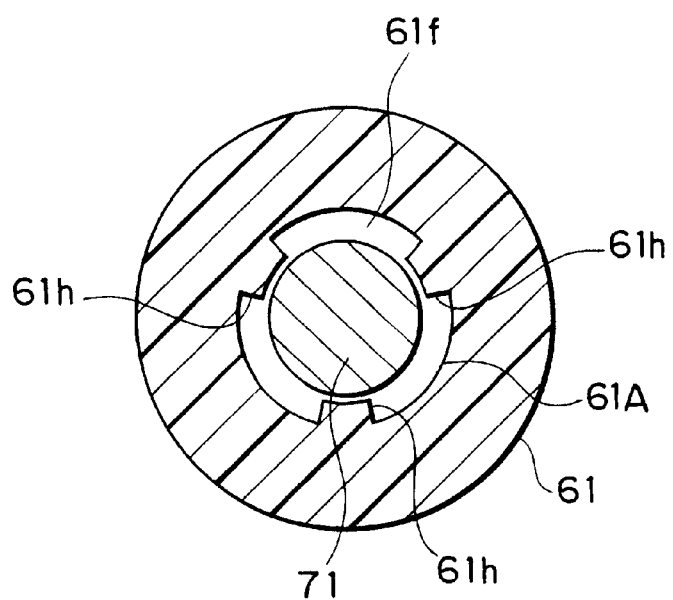
FIG. 13 is a sectional view at the line XIII—XIII of FIG. 12.
Figure 14:
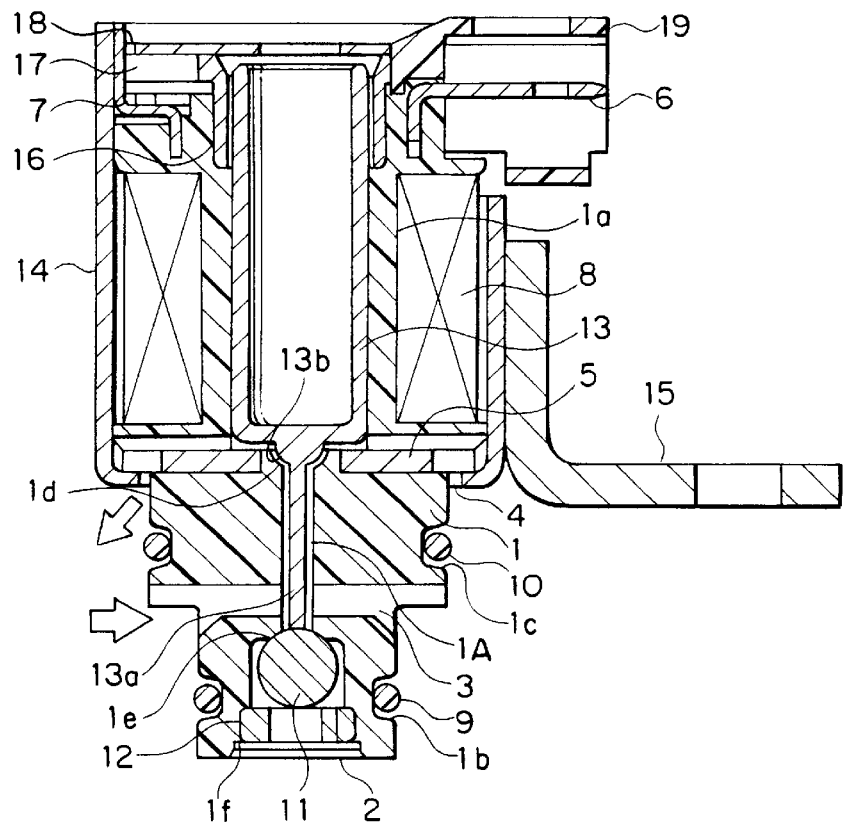
FIG. 14 is a sectional view illustrating an example of a conventional normally closed three way electromagnetic valve.
Figure 15:
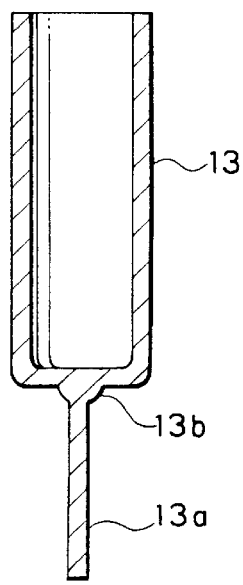
FIG. 15 is a sectional view of a plunger shown in FIG. 14.
Figure 16:
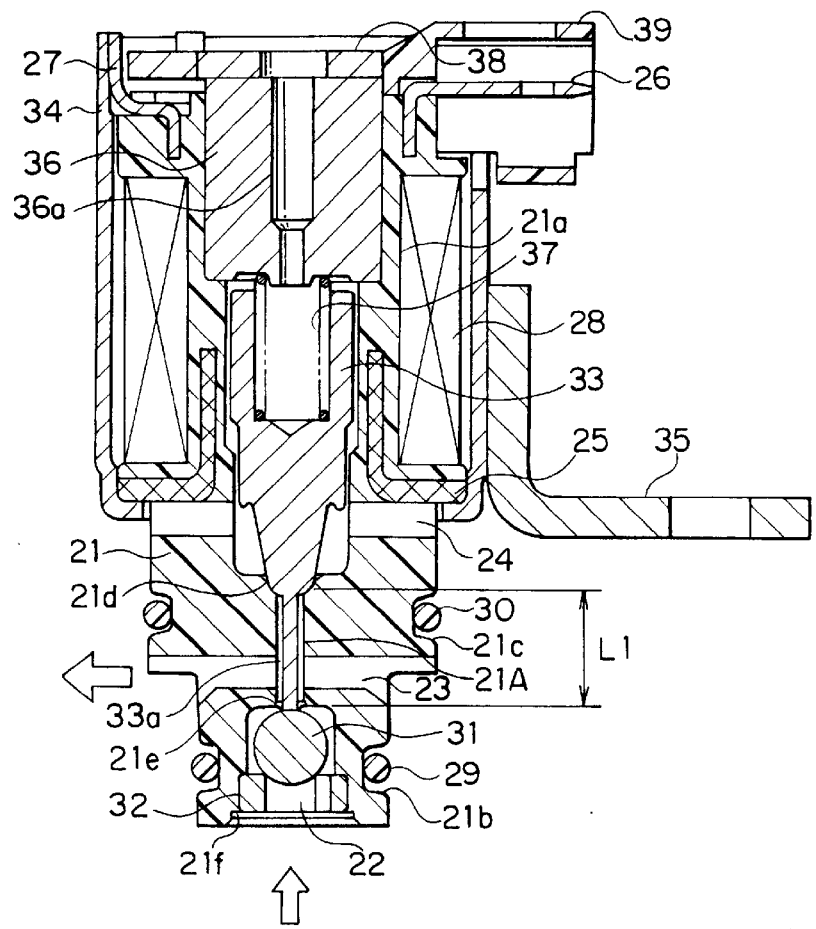
FIG. 16 is a sectional view illustrating an example of a conventional normally open three way electromagnetic valve.
Figure 17:
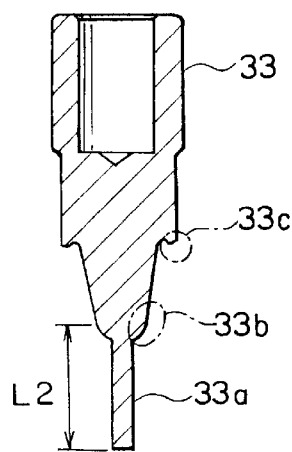
FIG. 17 is a sectional view of a plunger shown in FIG. 16.
Figure 18:
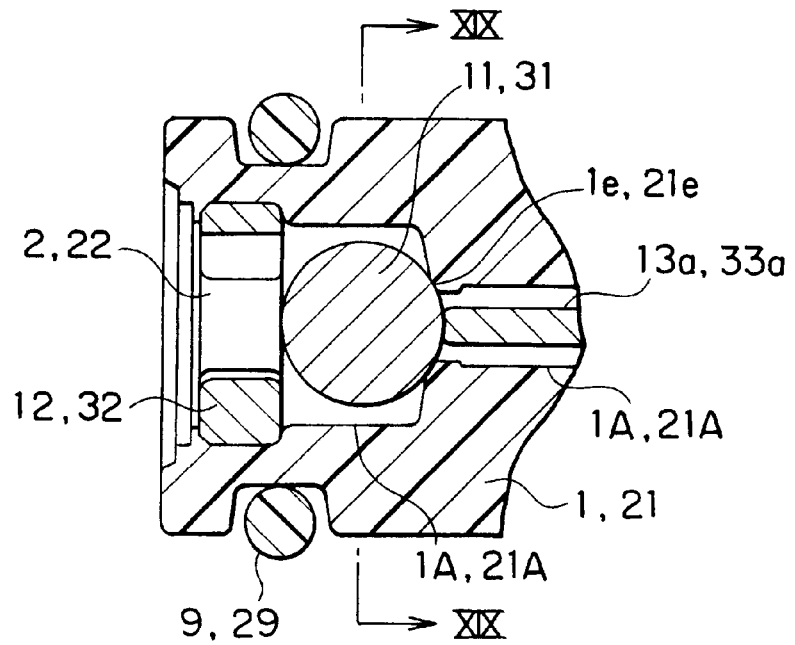
FIG. 18 is an enlarged sectional view illustrative of the distal end of a bobbin shown in FIG. 14 and FIG. 16.
Figure 19:
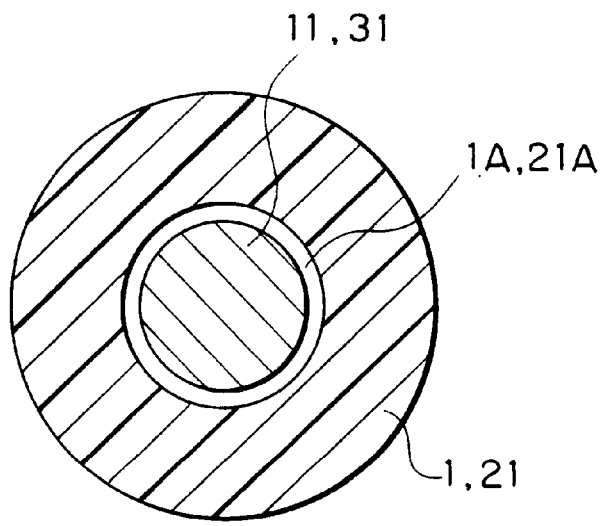
FIG. 19 is a sectional view at the line XIX—XIX of FIG. 18.
Figure 20:
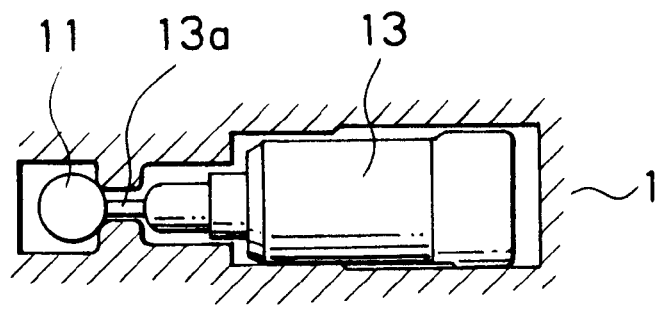
FIG. 20 is a schematic representation illustrative of the relationship between a plunger and a ball when the normally closed three way electromagnetic valve is in the de-energized state.

FIG. 12 is an enlarged sectional view illustrative of the distal end of the bobbin shown in FIG. 11, and FIG. 13 is a sectional view at the line XIII—XIII of FIG. 12. A plurality of ball guides 61h which extend in parallel to the operating direction of the plunger 73, i.e. the lateral direction in FIG. 12, and which jut out inward are provided equidistantly in the circumferential direction on the inner wall surface of the ball holding section 61f. There is an appropriate clearance between the ball guides 61h and the ball 71 to allow the ball 71 to move between the ball guides 61h.

The operation of the embodiment will now be described. When the coil 68 is not in an excited state, that is, when it is a de-energized state, the plunger 73 is moved to the ball 71 by the urging force of the spring 77, the plunger seat 74b is pushed against the discharge valve seat 61d, and the push rod 75 pushes the ball 71 which is, in turn, released from the input valve seat 61e, causing the input port 62 and the output port 63 to be communicated.

The moment the coil 68 is excited, magnetism runs through a magnetic circuit constituted by the yoke 65, the plunger 73, the core 76, the plate 78, and the case 74, causing the plunger 73 to be attracted to the core 76. The attracting force causes the plunger 73 to move toward the core 76 against the spring 77. This releases the plunger seat 74b from the discharge valve seat 61d and pushes the ball 71 against the input valve seat 61e, thus communicating the output port 73 and the discharge port 74.

Thus, the ball 71 reciprocates in the axial direction of the plunger 73 in the ball holding section 61f according to the movement of the plunger 73. In this case, the diameter of the ball holding section 61f which is a part of the fluid passage 61A is made sufficiently larger than the diameter of the ball 71 to ensure the flow rate. The ball 71 is guided by a plurality of ball guides 61h and it reciprocates along the same trajectory. Hence, the operation of the plunger 73 is stabilized and the operating voltage and operating current are also stabilized.

Furthermore, since the plunger main body 74 is provided with a small-diameter section 74a to increase the sectional area of the fluid passage 61A between the output port 63 and the discharge port 64, the flow rate at low temperature will be secured so as to ensure responsiveness of a hydraulic circuit even when a fluid such as oil, the viscosity of which increases at low temperature, is employed.

In the above example, the sectional area of the fluid passage 61A is increased by providing the plunger main body 74 with the small-diameter section 74*a*; however, the structure of the fluid passage 61A between the output port 63 and the discharge port 64 may be identical to that of the ball holding section 61*f*. More specifically, as shown in FIG. 9 and FIG. 10, a plurality of plunger guides (not shown) which extend parallel to the operating direction of the plunger 73 and which project inward may be provided at intervals in the circumferential direction on the wall surface of the fluid passage 61A between the output port 63 and the discharge port 64. The plunger guides may be provided on the outer peripheral surface of the plunger main body 74 between the output port 63 and the discharge port 64 such that they project outward as in the case of the example illustrated in FIG. 7 and FIG. 8.

The positions of the input port, the output port, and the discharge port are not limited to those in the first or second embodiments described above.

What is claimed is:

1. A three way electromagnetic valve comprising:
    a bobbin which has first through third ports, a fluid passage for communicating these ports with one another, a first valve seat provided between said first and second ports in said fluid passage, a second valve seat provided between said second and third ports in said fluid passage, and a ball holding section provided at an end of said fluid passage where said first port is located;
    a ball which is held in said ball holding section in such a manner that it may be reciprocated within said ball holding section so that said ball is movable into contact with and away from said first valve seat;
    a coil mounted on said bobbin; and
    a plunger which is inserted in said fluid passage, said plunger having a push rod held against said ball and a plunger seat that is movable into contact with and away from said second valve seat, said plunger being adaptable to reciprocate according to whether said coil is energized or de-energized; wherein
    a small-diameter section which has a diameter smaller than that of said plunger seat is formed at a portion of said plunger in said fluid passage between said second and third ports and between said plunger seat and said third port, so as to increase a size of said fluid passage along said small-diameter section, and wherein at least a part of said plunger along said small-diameter section continuously confronts said third port during a movement of said plunger between a first position where said plunger seat is seated on said second valve seat and a second position where said plunger seat is unseated from said second valve seat.

2. A three way electromagnetic valve according to claim 1, wherein said plunger has a resinous plunger main body on which said plunger seat and said small-diameter section are formed, and said push rod is insert-molded in said plunger main body.

3. A three way electromagnetic valve according to claim 2, wherein an outer peripheral section of said push rod is machined so as to prevent it from coming off said plunger main body.

4. A three way electromagnetic valve according to claim 1, wherein one of a wall surface of said fluid passage between said second port and said third port and an outer peripheral surface of said plunger is provided with a plurality of plunger guides which extend parallel to an operating direction of said plunger and which project in a radial direction of said plunger and which are provided at intervals in the circumferential direction of said plunger.

5. A three way electromagnetic valve according to claim 1, wherein:
    an inner wall surface of said ball holding section is provided with a plurality of ball guides which extend in a direction parallel to an operating direction of said plunger, said plurality of ball guides projecting inward and being spaced at intervals in the circumferential direction of said ball holding section.

6. A three way electromagnetic valve according to claim 5, wherein said ball guides are provided at equal intervals in the circumferential direction.

7. A three way electromagnetic valve according to claim 5, wherein there is a clearance between said ball guides and said ball which allows a movement of said ball between said ball guides.

8. A three way electromagnetic valve comprising:
    a bobbin which has first through third ports, a fluid passage for communicating these ports with one another, a first valve seat provided between said first and second ports in said fluid passage, a second valve seat provided between said second and third ports in said fluid passage, and a ball holding section provided at an end of said fluid passage where said first port is located;
    a ball which is held in said ball holding section in such a manner that it may be reciprocated within said ball holding section so that said ball is movable into contact with and away from said first valve seat;
    a coil mounted on said bobbin; and
    a plunger which is inserted in said fluid passage, said plunger having a push rod held against said ball, and a plunger seat that is movable into contact with and away from said second valve seat, said plunger being adaptable to reciprocate according to whether the coil is energized or de-energized; wherein
    a plurality of plunger guides which extend in a direction parallel to an operating direction of said plunger and which project in a radial direction of said plunger are provided at intervals in the circumferential direction of said plunger on a wall surface of said fluid passage between said second port and said third port; and
    wherein a portion of said plunger positioned in said fluid passage between said second and third ports and between said plunger seat and said third port is provided with a small-diameter section having a diameter smaller than the diameter of said plunger seat so as to increase a size of said fluid passage along said small-diameter section, and wherein at least a part of said plunger along said small-diameter section continuously confronts said third port during a movement of said plunger between a first position where said plunger seat is seated on said second valve seat and a second position where said plunger seat is unseated from said second valve seat.

9. A three way electromagnetic valve according to claim 8, wherein an inner wall surface of said ball holding section is provided with a plurality of ball guides which extend in a direction parallel to an operating direction of said plunger, said plurality of ball guides projecting inward and being spaced at intervals in the circumferential direction of said ball holding section.

10. A three way electromagnetic valve comprising:
- a bobbin which has first through third ports, a fluid passage for communicating these ports with one another, a first valve seat provided between said first and second ports in said fluid passage, a second valve seat provided between said second and third ports in said fluid passage, and a ball holding section provided at an end of said fluid passage where said first port is located;
- a ball which is held in said ball holding section in such a manner that it may be reciprocated within said ball holding section so that said ball is movable into contact with and away from said first valve seat;
- a coil mounted on said bobbin; and
- a plunger which is inserted in said fluid passage, said plunger having a push rod held against said ball and a plunger seat that is movable into contact with and away from said second valve seat, said plunger being adaptable to reciprocate according to whether said coil is energized or de-energized; wherein
- a small-diameter section which has a diameter smaller than that of said plunger seat is formed at a portion of said plunger in said fluid passage between said second and third ports and between said plunger seat and said third port, so as to increase a size of said fluid passage along said small-diameter section, and wherein at least a part of said plunger along said small-diameter section confronts said third port; and wherein said plunger seat is located between said small-diameter section and said second port during a movement of said plunger.

* * * * *